United States Patent [19]

Iwata et al.

[11] 4,400,486

[45] Aug. 23, 1983

[54] ACRYLIC ADHESIVE COMPOSITION CONTAINING CYCLOPENTADIENE RESIN

[75] Inventors: Riso Iwata, Tokyo; Akira Wada, Yokohama, both of Japan

[73] Assignee: Nippon Zeon Co. Ltd., Tokyo, Japan

[21] Appl. No.: 409,315

[22] Filed: Aug. 18, 1982

[30] Foreign Application Priority Data

Aug. 26, 1981 [JP] Japan .................. 56-133745

[51] Int. Cl.$^3$ ................ C08L 33/08; C08L 45/00
[52] U.S. Cl. ........................ 525/57; 525/192; 525/203; 525/207; 525/218; 525/221; 525/223; 525/227; 525/228; 525/230
[58] Field of Search ............. 525/221, 227, 228, 57, 525/192

[56] References Cited

U.S. PATENT DOCUMENTS 4,299,950 10/1981 Iwata et al. .................. 528/306
4,330,448 5/1982 Iwata ........................... 526/79

FOREIGN PATENT DOCUMENTS 54-3136 1/1979 Japan .

Primary Examiner—Carman J. Seccuro
Attorney, Agent, or Firm—Sherman & Shalloway

[57] ABSTRACT

An acrylic adhesive composition comprising an acrylic polymer as a base resin and a modified cyclopentadiene resin having a softening point of at least 60° C. obtained by copolymerizing (a) 85 to 50% by weight of a cyclopentadiene monomer and (b) 15 to 50% by weight of a polar vinyl monomer or a hydrogenation product of said cyclopentadiene resin as a tackifier.

8 Claims, No Drawings

ACRYLIC ADHESIVE COMPOSITION CONTAINING CYCLOPENTADIENE RESIN

This invention relates to a novel acrylic adhesive composition, and more specifically, to an acrylic adhesive composition comprising an acrylic polymer and a modified cyclopentadiene resin or its hydrogenation product which has a well balanced combination of three factors of adhesion.

Natural rubber, a styrene/butadiene copolymer rubber, a styrene/isoprene block copolymer, etc. have been used as base resins for pressure-sensitive adhesives or adhesives, and recently, acrylic polymers were suggested as a substitute for these rubbery base resins.

While the acrylic polymers are colorless and transparent and have excellent weatherability and oil resistance, they have poor compatibility with tackifiers generally used in the field of rubbery adhesive compositions. In order, therefore, to obtain an adhesive composition having a well balanced combination of the so-called three factors of adhesion, i.e. initial adhesion strength, adhesion strength and holding power, it is necessary to employ a complex and uneconomical means, for example to change the composition of the polymer.

The present inventors have extensively made investigations in order to develop a tackifier having compatibility with acrylic polymers, and finally found that a specified cyclopentadiene polymer is effective for this purpose.

Thus, according to this invention, there is provided an acrylic adhesive composition comprising an acrylic polymer as a base resin and a modified cyclopentadiene resin having a softening point of at least 60° C. obtained by copolymerizing (a) 85 to 50% by weight of a cyclopentadiene monomer and (b) 15 to 50% by weight of a polar vinyl monomer, or its hydrogenation product as a tackifier.

The acrylic polymer used in this invention may be any of acrylate ester polymers heretofore known for use in acrylic pressure-sensitive adhesives or adhesives. For example, homopolymers of acrylic esters having a molecular weight of at least 20,000, preferably 50,000 to 1,000,000, copolymers of acrylic esters with each other, and copolymers of acrylic esters with other copolymerizable ethylenically unsaturated monomers can be selected properly depending upon the purpose of using the final product. Preferred acrylic polymers are copolymers of at least 30% by weight of at least one acrylic ester having a $C_1$–$C_{12}$ alkyl group and not more than 70% by weight of at least one other copolymerizable ethylenically unsaturated monomer. The acrylic ester imparts the basic three factors of adhesion to the acrylic polymer itself, and acrylic esters having a $C_4$–$C_8$ alkyl group are especially preferred. Specific examples of the acrylic monomer include methyl acrylate, ethyl acrylate, n-propyl acrylate, sec-propyl acrylate, n-butyl acrylate, sec-propyl acrylate, n-butyl acrylate, sec-butyl acrylate, t-butyl acrylate, amyl acrylate, hexyl acrylate, octyl acrylate, sec-ethylhexyl acrylate, undecyl acrylate and lauryl acrylate.

The other copolymerizable ethylenically unsaturated monomer can serve to control the glass transition point, molecular weight and polarity of a copolymer (i.e., acrylic polymer) formed by its reaction with the acrylic ester so that they suit the purpose of using the final product. Such unsaturated monomers can be roughly divided into functional monomers and non-functional monomers.

Examples of the functional monomers include carboxy-containing monomers such as acrylic acid, methacrylic acid, itaconic acid, crotonic acid, maleic acid, maleic anhydride and butyl maleate; hydroxy-containing monomers such as 2-hydroxyethyl acrylate or methacrylate, 2-hydroxypropyl acrylate or methacrylate and allyl alcohol; monomers containing an amide group such as (meth)acrylamide, N-methyl(meth)acrylamide and N-ethyl (meth)acrylamide; monomers having an amide group and a methylol group such as N-methylol(meth)acrylamide and dimethylol (meth)acrylamide; amino-containing monomers such as aminoethyl acrylate or methacrylate, dimethylaminoethyl acrylate or methacrylate and vinylpyridine; and epoxy-containing monomers such as glycidyl acrylate or methacrylate and an epichlorohydrin-modified product of dimethylaminoethyl acrylate or methacrylate.

Examples of the non-functional monomers include acrylic esters such as stearyl acrylate; acrylic or methacrylic esters such as methyl acrylate or methacrylate, ethyl acrylate or methacrylate, propyl acrylate or methacrylate, butyl acrylate or methacrylate, hexyl acrylate or methacrylate, and 2-ethylhexyl acrylate or methacrylate; diesters of $\alpha,\beta$-unsaturated dibasic acids, such as dibutyl maleate, dioctyl maleate and dibutyl fumarate; vinyl esters such as vinyl acetate and vinyl propionate; vinyl ethers; vinyl aromatic compounds such as styrene, $\alpha$-methylstyrene, and vinyltoluene; and acrylonitrile and methacrylonitrile.

Monomers having at least two ethylenically unsaturated bonds, such as divinylbenzene, diallyl maleate, diallyl phthalate, ethylene glycol diacrylate or dimethacrylate, trimethylolpropane triacrylate or trimethacrylate and methylenebis-acrylamide or methacrylamide, and olefins such as ethylene and propylene may also be used as the copolymerizable ethylenically unsaturated monomer so long as they do not alter the basic properties of the acrylic polymer for tacky agents and adhesives.

The acrylic polymer can be produced by bulk polymerization, solution polymerization, emulsion polymerization, suspension polymerization, etc. A suitable method may be selected according to the form of the acrylic polymer to be used as a tacky agent or adhesive together with a tackifier.

The tackifier as the other component of the composition of this invention is a modified cyclopentadiene resin having a softening point of at least 60° C., preferably 65° to 120° C., obtained by copolymerizing (a) 85 to 50% by weight, preferably 80 to 60% by weight, of a cyclopentadiene monomer and (b) 15 to 50% by weight, preferably 20 to 40% by weight, of a polar vinyl monomer; or a hydrogenation product of the modified cyclopentadiene resin.

The modified cyclopentadiene resin is produced by known methods, such as heat polymerization and cationic polymerization. Those obtained by heat polymerization are excellent because they impart initial adhesion strength and holding power while retaining adhesion strength which is characteristic of acrylic adhesive compositions.

The cyclopentadiene monomer used in the polymerization denotes cyclopentadiene or its derivatives. Specifically, it includes, for example, cyclopentadiene, alkyl-substituted (e.g., methyl- or ethyl-substituted) cyclopentadiene, and dimers, trimers or codimers of these.

Mixtures of these may also be used. Since cyclopentadiene exists stably as dicyclopentadiene at ordinary temperatures, cyclopentadiene and dicyclopentadiene are usually treated as quite the same.

Examples of the polar vinyl monomer copolymerizable with the cyclopentadiene monomer include unsaturated alcohols such as allyl alcohol, crotyl alcohol, 1,4-butenediol, hydroxyethyl acrylate, hydroxyethyl methacrylate and vinylphenol; unsaturated carboxylic acids such as acrylic acid, methacrylic acid, crotonic acid, maleic acid, fumaric acid, citraconic acid, itaconic acid, maleic anhydride and citraconic anhydride; unsaturated esters such as vinyl acetate, vinyl propionate, allyl acetate, methyl acrylate, ethyl acrylate, butyl acrylate, hexyl acrylate, octyl acrylate, methyl methacrylate and butyl methacrylate; unsaturated nitriles such as acrylonitrile and methacrylonitrile; and unsaturated ethers such as allyl glycidyl ether. Of these, the hydroxy-containing monomers, the carboxy-containing monomers and the monomers containing ester linkages produce superior results.

The proportions of the cyclopentadiene monomer and the polar vinyl monomer are such that the latter is used in an amount of 15 to 50% by weight, preferably 20 to 40% by weight, based on the total weight of these. If the proportion of the polar vinyl monomer is less than 15% by weight, the compatibility of the tackifier with the acrylic polymer is poor, and tackiness cannot be imparted to the acrylic polymer. If it exceeds 50% by weight, a resin having the desired softening point is difficult to obtain and the color of the resin is degraded.

The modified cyclopentadiene resin used in this invention should have a softening point of at least 60° C. If its softening point is below 60° C., the adhesion strength of the resulting composition is reduced. On the other hand, if its softening point is too high, it has a reduced effect of imparting initial adhesion strength. The preferred softening point of the modified cyclopentadiene resin is 60° to 150° C.

The modified cyclopentadiene resin so obtained may be directly used as a tackifier. Preferably, it is hydrogenated for use as a tackifier, in which case the resin has improved weatherability and color over the non-hydrogenated resin. Hydrogenation may be carried out by known methods using hydrogenation catalysts such as palladium and nickel. The degree of hydrogenation may be properly selected according to the required properties, but from the standpoint of weatherability and heat stability, it is such that the hydrogenated resin has a bromine value of not more than 10.

The adhesive composition of this invention consists essentially of the acrylic polymer and the modified cyclopentadiene resin or its hydrogenation product. The mixing ratio of these may be properly selected according to the required properties. Usually, 100 parts by weight of the former and 5 to 100 parts by weight, preferably 10 to 50 parts by weight, more preferably 15 to 40 parts by weight, of the latter are used. If the amount of the latter is outside the above-specified range, the effect of imparting initial adhesion strength tends to be reduced.

The method of mixing the two components can be properly chosen according to the form of the acrylic polymer or the form of the final adhesive composition. For example, a solution or emulsion of the tackifier may be added during or after the production of the acrylic polymer.

As required, it is possible to mix them further with other polymers or tackifiers compatible with the acrylic polymer, or conventional antioxidants, stabilizers, crosslinking agents, reactive diluents, pigments, fillers, plasticizers, etc.

The resultant adhesive composition of this invention may be used as a pressure-sensitive adhesive or adhesive in the form of a solution, an aqueous emulsion, a nonaqueous emulsion, a hot melt, a solventless liquid diluted with a reactive diluent, etc. for the production of tapes, labels, stickers, sheets, etc.

The following examples illustrate the present invention further. All parts and percentages in these examples are by weight.

REFERENTIAL EXAMPLE 1

Production of an acrylic polymer:

A four-necked separable flask equipped with a reflux condenser was charged with 90 parts of toluene and 60 parts of n-butanol, and they were heated to 70° C. A mixture consisting of 80 parts of 2-ethylhexyl acrylate, 16 parts of vinyl acetate, 4 parts of acrylic acid and 2.5 parts of benzoyl peroxide was added over the course of 2.5 hours while maintaining the temperature of the inside of the flask at 70° C. The temperature was raised to 90° C., and the reaction was carried out further for 1.5 hours. The residual monomers were removed to give an acrylic polymer solution having a number average molecular weight of 130,000 and an involatile content of 40%.

REFERENTIAL EXAMPLE 2

Production of an acrylic polymer emulsion:

A four-necked separable flask equipped with a reflux condenser was charged with 70 parts of water, 0.02 part of sodium alkylsulfate and 0.2 part of ammonium persulfate. Then, 10 parts of a monomeric mixture consisting of 80% of 2-ethylhexyl acrylate, 16% of vinyl acetate and 4% of acrylic acid was introduced. The temperature was gradually raised to 70° C., and while maintaining a reaction temperature of 70° C., an emulsion composed of 90 parts of the above-mentioned monomeric mixture, 30 parts of water and 0.18 part of sodium alkylsulfate was added over the course of 2.5 hours. The reaction was further carried out at 90° C. for 1.5 ours. The residual monomers were removed to give an acrylic polymer emulsion having a number average molecular weight of 160,000 and an involatile content of 50%.

REFERENTIAL EXAMPLE 3

Production of a modified cyclopentadiene resin:

Each of the monomeric mixtures indicated in Table 1 was charged into an autoclave and reacted at 260° C. for 4 hours in an atmosphere of nitrogen. By removing low boiling fractions, a modified cyclopentadiene resin was obtained.

TABLE 1

| Resin | A(*) | B(*) | C | D | E | F | G |
|---|---|---|---|---|---|---|---|
| Monomers (%) | | | | | | | |
| Dicyclopentadiene | 90 | 80 | 65 | 55 | 40 | 65 | 65 |
| Vinyl acetate | 10 | 20 | 35 | 45 | 60 | — | — |
| Allyl alcohol | — | — | — | — | — | 35 | — |
| Acrylic acid | — | — | — | — | — | — | 35 |
| Softening point (°C.) | 135 | 100 | 80 | 65 | 40 | 75 | 75 |

TABLE 1-continued

| Resin | A(*) | B(*) | C | D | E | F | G |
|---|---|---|---|---|---|---|---|
| Gardner color number | 2 | 3 | 5 | 6 | 10 | 7 | 6 |

(*)The polymerization was carried out in a mixture of 80% of the monomers and 20% of xylene.

REFERENTIAL EXAMPLE 4

Production of a hydrogenated cyclopentadiene resin:

An autoclave was charged with 100 parts of each of the resins C, F and G obtained in Referential Example 3, 100 parts of cyclohexane and 3 parts of 5% palladium-carbon, and in an atmosphere of hydrogen, the temperature was gradually raised to 150° C. Hydrogen was added to maintain the pressure of the inside of the autoclave at 50 kg/cm², and each of the above-mentioned resins was hydrogenated for 4 hours. Cyclohexane was distilled off to give a hydrogenated cyclopentadiene resin (designated as C—H, F—H or G—H).

TABLE 2

| Hydrogenated resin | C-H | F-H | G-H |
|---|---|---|---|
| Starting resin | C | F | G |
| Softening point (°C.) | 75 | 75 | 75 |
| Gardner color number | 1 | 1 | 1 |
| Bromine value | 7-8 | 7-8 | 7-8 |

EXAMPLE 1

One hundred parts of the acrylic polymer solution obtained in Referential Example 1 was mixed with 10 parts (corresponding to 25 parts per 100 parts of the acrylic polymer) of each of the resins obtained in Referential Examples 3 and 4. The mixture was coated to a thickness of 25μ on a 1 mil-thick polyester film to form a pressure-sensitive adhesive tape. Its initial adhesion strength, adhesion strength, and holding power were measured.

A mixed solution comprising equal amounts of the acrylic polymer and the cyclopentadiene resin was coated on a glass plate, and left to stand for a day and night. The transparency of the film formed on the glass plate was then observed to judge compatibility between the acrylic polymer and the cyclopentadiene resin.

The results are shown in Table 3.

TABLE 3

| Run No. | | Resin | Initial adhesion strength (g/cm²) (*1) | Adhesion strength (g/25mm) (*2) | Holding power (min.) (*3) | Compatibility |
|---|---|---|---|---|---|---|
| Control | 1-1 | — | 1000 | 800 | 25 | — |
|  | 1-2 | A | 100 | 35 | 1> | None |
| Invention | 1-3 | B | 1700 | 1650 | 85 | Good |
|  | 1-4 | C | 2000 | 1500 | 90 | " |
|  | 1-5 | D | 1800 | 1350 | 90 | " |
| Control | 1-6 | E | 1500 | 450 | 50 | " |
|  | 1-7 | F | 1900 | 1600 | 95 | " |
| Invention | 1-8 | G | 2000 | 1550 | 90 | " |
|  | 1-9 | C-H | 1850 | 1600 | 85 | " |
|  | 1-10 | F-H | 1950 | 1600 | 90 | " |
|  | 1-11 | G-H | 1800 | 1650 | 95 | " |

(*1): Using a probe with a diameter of 5 mm, the initial adhesion strength was measured at a pulling speed of 1 cm/sec, a temperature of 23° C. and a contact pressure of 10 g/cm² with a contact time of 1 second.
(*2): In accordance with JIS Z-1522, an adhesive tape was applied, 25 mm in width and 100 mm in length, to a stainless steel plate polished by water-resistant polishing paper (#280), and peeled at 25° C. and a speed of 200 mm/min. in a 180° C. direction.
(*3): In accordance with JIS Z-1524, a load of 1 kg was applied at 25° C. to the same stainless steel plate as treated in (*2) above, and the time which elapsed until the tape dropped off from the stainless steel plate was measured.

The results show that when the resin A is used, it cannot exibit its tackifying property because of its poor compatibility with the acrylic polymer, and that when the resin E is used, the adhesion strength is undesirably reduced.

EXAMPLE 2

Example 1 was followed except that the hydrogenated cyclopentadiene resin (resin G-H) obtained in Referential Example 4 was added in a predetermined amount to the acrylic polymer solution obtained in Referential Example 1. The results are shown in Table 4.

TABLE 4

| | Control | Invention | | |
|---|---|---|---|---|
| Run No. | 2-1 | 2-2 | 2-3 | 2-4 |
| Amount of resin G-H added (parts) (*4) | 0 | 10 | 30 | 45 |
| Initial adhesion strength (g/cm²) | 1000 | 1400 | 1900 | 1450 |
| Adhesion strength (g/25 mm) | 800 | 1600 | 1650 | 1600 |
| Holding power (minutes) | 25 | 65 | 90 | 80 |

(*4): Amount per 100 parts of the acrylic polymer.

EXAMPLE 3

An emulsion of each of the modified cyclopentadiene resins indicated in Table 5 (prepared by using 100 parts of the resin, 2 parts of sodium alkylsulfate and 65 parts of water) was mixed with the acrylic polymer emulsion obtained in Referential Example 2 so that the amount of the former was 25 parts as the resin per 100 parts of the acrylic polymer in the latter. The mixture was coated on a 1 mil-thick polyester film to a thickness of 25μ to form a pressure-sensitive adhesive tape. The initial adhesion strength, adhesion strength, and holding power of the adhesive tape were measured. The results are shown in Table 5.

TABLE 5

| Run No. | | Resin | Initial adhesion strength (g/cm²) | Adhesion strength (g/25mm) | Holding power (min.) |
|---|---|---|---|---|---|
| Control | 3-1 | — | 800 | 1000 | 15 |
|  | 3-2 | A(*5) | 70 | 20 | 1> |
| Invention | 3-3 | B(*6) | 1500 | 1950 | 80 |
|  | 3-4 | C | 1850 | 1900 | 95 |
|  | 3-5 | D | 1750 | 1600 | 90 |
| Control | 3-6 | E | 1100 | 650 | 45 |
| Invention | 3-7 | F | 1800 | 1850 | 90 |

TABLE 5-continued

| Run. No. | Resin | Initial adhesion strength (g/cm²) | Adhesion strength (g/25mm) | Holding power (min.) |
|---|---|---|---|---|
| 3-8 | G | 1900 | 1850 | 95 |

(*5): 30 Parts of toluene was used in preparing the emulsion of the modified cyclopentadiene resin.
(*6): 20 Parts of toluene was used in preparing the emulsion of the modified cyclopentadiene resin.

It is seen from the results that the emulsion-type adhesive composition shows the same tendency as the solution-type composition.

What we claim is:

1. An acrylic adhesive composition comprising an acrylate ester polymer as a base resin and a modified cyclopentadiene resin having a softening point of at least 60° C. obtained by copolymerizing (a) 85 to 50% by weight of a cyclopentadiene monomer and (b) 15 to 50% by weight of a polar vinyl monomer or a hydrogenation product of said cyclopentadiene resin as a tackifier.

2. The composition of claim 1 wherein the amount of the tackifier is 5 to 100 parts by weight per 100 parts by weight of the base resin.

3. The composition of claim 1 wherein the acrylate ester polymer is a homopolymer or copolymer derived from 30–100% by weight of an acrylic ester and 0–70% by weight of another ethylenically unsaturated monomer copolymerizable therewith.

4. The composition of claim 1 wherein the modified cyclopentadiene resin has a softening point of 60° to 150° C.

5. The composition of claim 1 wherein the modified cyclopentadiene resin is produced by heat polymerization.

6. The composition of claim 1 wherein the cyclopentadiene monomer is cyclopentadiene, an alkyl-substituted cyclopentadiene, or a dimer, trimer or codimer thereof.

7. The composition of claim 1 wherein the polar vinyl monomer is an unsaturated alcohol, an unsaturated carboxylic acid, an unsaturated ester, an unsaturated nitrile or an unsaturated ether.

8. An acrylic adhesive composition comprising an acrylate ester polymer as a base resin and a hydrogenation product of a modified cyclopentadiene resin having a softening point of at least 60° C. obtained by copolymerizing (a) 85 to 50% by weight of a cyclopentadiene monomer and (b) 15 to 50% by weight of a polar vinyl monomer as a tackifier.

* * * * *